United States Patent [19]

Koyanagi et al.

[11] Patent Number: 5,065,270
[45] Date of Patent: Nov. 12, 1991

[54] THIN FILM MAGNETIC RECORDING HEAD WITH A LOW RESISTANCE COIL FORMED BY TWO PROCESSES

[75] Inventors: Tsutomu Koyanagi; Fujimi Kimura, both of Tokyo, Japan

[73] Assignee: TDK Corporation, Tokyo, Japan

[21] Appl. No.: 524,565

[22] Filed: May 17, 1990

[30] Foreign Application Priority Data

May 17, 1989 [JP] Japan .................................. 1-123373

[51] Int. Cl.⁵ ................................................ G11B 5/17
[52] U.S. Cl. .................................................... 360/123
[58] Field of Search ............... 360/123, 126, 125, 122, 360/124

[56] References Cited

U.S. PATENT DOCUMENTS 4,684,438 8/1987 Lazzari ................................ 360/123

Primary Examiner—John H. Wolff
Assistant Examiner—Craig A. Renner
Attorney, Agent, or Firm—Oblon, Spivak, McClelland, Maier & Neustadt

[57] ABSTRACT

A thin film magnetic head comprises a substrate, and magnetic films and a conductive coil which are formed on the substrate to constitute a thin film magnetic circuit, wherein the conductive coil has a shape in cross section so that its upper part has a curved convex surface.

1 Claim, 7 Drawing Sheets

FIG.7 (a) PRIOR ART
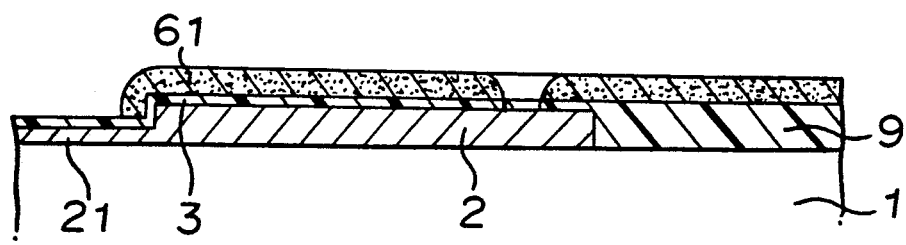
FIG.7 (b) PRIOR ART
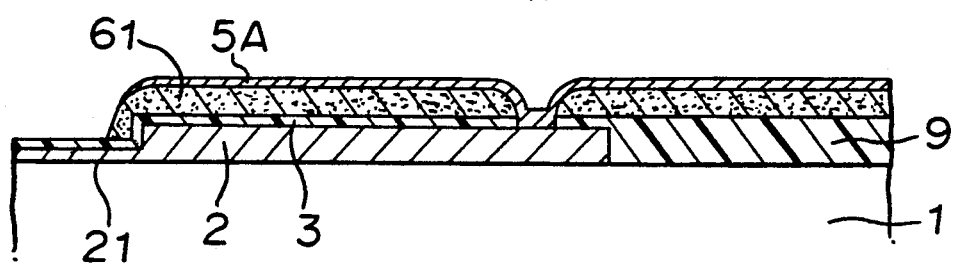
FIG.7 (c) PRIOR ART
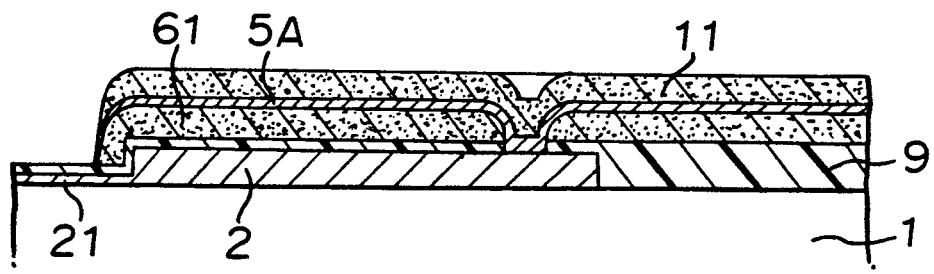
FIG.7 (d) PRIOR ART
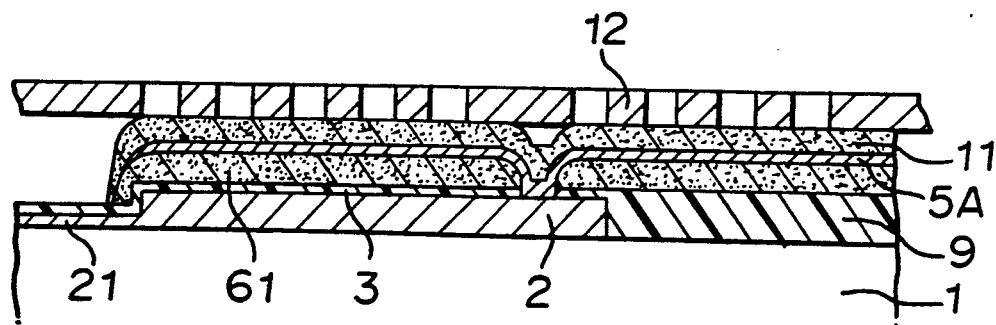

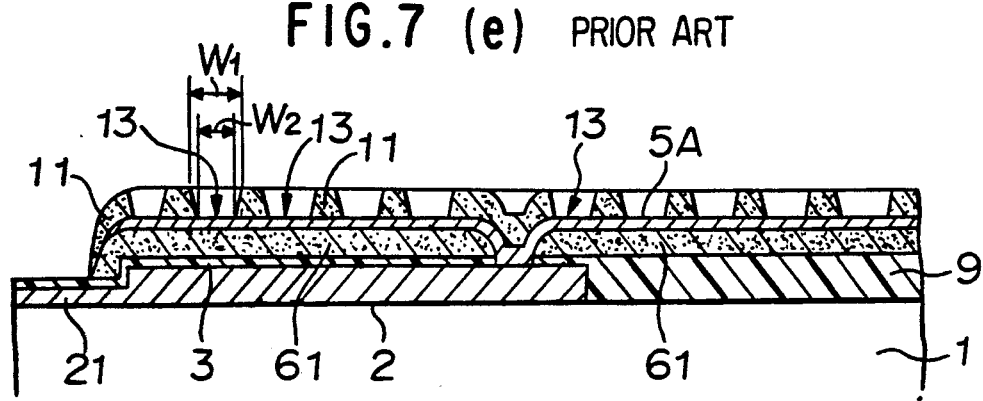
FIG.7 (e) PRIOR ART
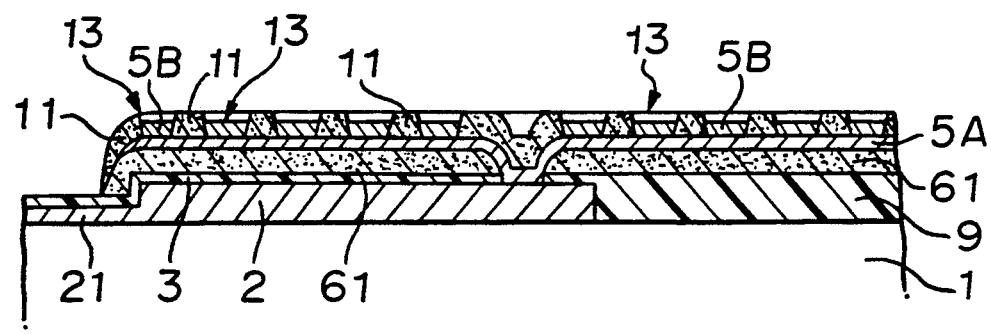
FIG.7 (f) PRIOR ART
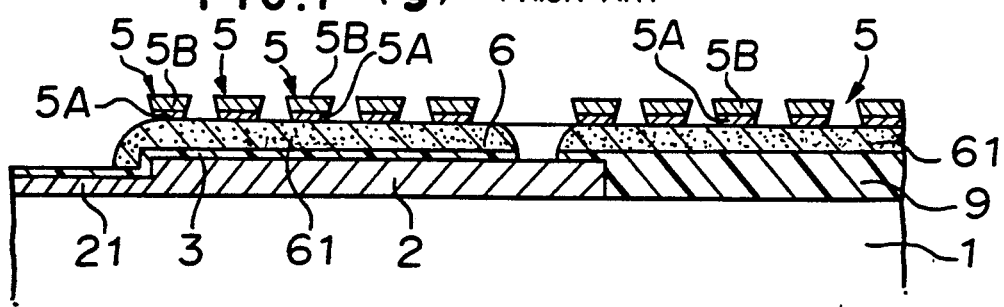
FIG.7 (g) PRIOR ART
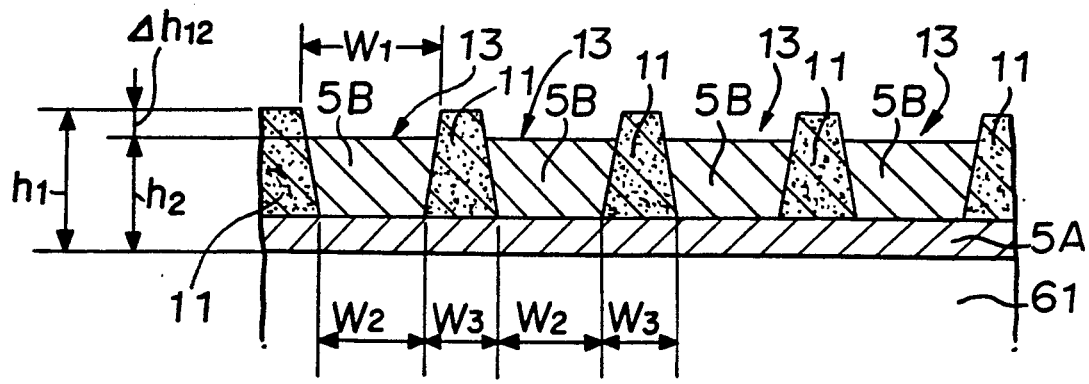
FIGURE 8 ically, the present invention relates to a thin film
THIN FILM MAGNETIC RECORDING HEAD WITH A LOW RESISTANCE COIL FORMED BY TWO PROCESSES

BACKGROUND OF THE INVENTION

1. Field of the Invention

The present invention relates to a thin film magnetic head used for an in-plane recording/reproducing system or a vertical recording/reproducing system. More particularly, the present invention relates to a thin film magnetic head which increases the cross-sectional area of a conductive coil and reduces an electric resistance without a danger of the occurrence of a short circuit and of the reduction in the density of wiring.

2. Descussion of Background

For the thin film magnetic head, there have been known two systems, i.e. an in-plane recording/reproducing system and a vertical recording/reproducing system.

FIG. 4 is a perspective view of an important part of a conventional thin film magnetic head for an in-plane recording/reproducing system and FIG. 5 is a cross-sectional view of the important part. In FIGS. 4 and 5, a reference numeral 1 designates a substrate, a numeral 2 designates a lower magnetic film, a numeral 3 designates a gap film made of a material such as alumina, a numeral 4 designates an upper magnetic film, a numeral 5 designates a conductive coil, numeral 6 designates insulating films. Numerals 61–63 separately designate these insulating films composed of an organic insulation resin such as novolak resin, numerals 7 and 8 designate leading parts, a numeral 9 designates an insulating film and a numeral 10 designates a protective layer made of a material such as alumina.

The substrate 1 is so constructed that an insulating film 102 such as $Al_2O_3$ or the like is formed on a ceramic structural body 101 of a material such as $Al_2O_3.TiC$ or the like.

Ends of the magnetic films 2 and 4 constitute pole portions 21, 41 which oppose through the gap film 3 made of a material such as alumina and which effect writing and reading function.

The conductive coil 5 constitutes a thin film magnetic circuit in association with the magnetic films 2, 4 and the gap film 3. The conductive coil 5 has a laminated structure wherein a conductive film 5B is formed by Cu plating on an undercoat conductive film 5A which is formed by the spattering of Cu/Ti. The conductive coil 5 is formed in a spiral form around the connect portions of the magnetic films 2 and 4 to yoke portions 22, 42. As shown in an enlarged view in FIG. 6, the conductive coil 5 has an inversed trapezoidal shape in cross section wherein the upper side is substantially flat.

The above-mentioned thin film magnetic head is prepared by a highly accurate pattern-forming technique called photolithography which is utilized in an IC manufacturing technology.

An example of the manufacturing process of the conductive coil will be described with reference to FIG. 7.

As shown in FIG. 7a, the magnetic film 2 and the gap film 3 are successively formed on the substrate 1, and then the insulating film 61 is formed on the gap film 3. The insulating film 61 is generally formed in such a manner that a novolak series positive type photoresist film is applied by coating; it is subjected to soft-baking at a predetermined temperature and for a predetermined time; treatments of light exposure, developing and water washing are conducted to the film, and then the film is heated.

Then, the undercoat conductive film 5A is formed on the insulating film 61 by spattering a material of Cu/Ti as shown in FIG. 7b.

Then, as shown in FIG. 7c, a photoresist film 11 is applied on the surface of the undercoat conductive film 5A, followed by soft-baking at a predetermined temperature and for a predetermined time.

As shown in FIG. 7d, a photomask 12 is positioned on the photoresist film 11; light is exposed on the photomask 12, and then necessary step such as developing and water-washing and so on are conducted, whereby a pattern 13 corresponding to the pattern of the photomask 12 is obtainable as shown in FIG. 7e. In this case, the photomask 12 has a spiral pattern, and accordingly the pattern 13 is also spiral. Since the pattern 13 is formed by a photolithography technique, the width $W_1$ at the side of opening is broader than the width $W_2$ at the side of bottom.

As shown in FIG. 7f, the conductive film 5B is formed inside the pattern 13 by Cu plating, whereby a coil-like pattern is formed by the conductive film 5B. Since the cross-sectional area of the pattern 13 is in an inversed trapezoidal shape wherein the width $W_1$ at the side of opening is broader than the width $W_2$ at the side of bottom, the cross-sectional surface of the conductive layer 5B has also an inversed trapezoidal shape wherein the upper part is substantially flat.

Then, the photoresist film 11 is removed, and the undercoat conductive film 5A is removed by ion milling, whereby a coiled pattern is obtained in accordance with the pattern of conductive film 5B. Thus, the conductive coil 5 is formed on the insulating film 61 as shown in FIG. 7g. Since the conductive film 5B has an inversed trapezoidal shape, the conductive coil 5 thus formed has an inversed trapezoidal shape in cross-section wherein the upper part of it is flat.

The processes as shown in FIGS. 7a through 7g are repeated to thereby form laminated layers of an insulating film 62, a conductive coil 5 and an insulating film 63. Further, a magnetic film 4 is formed on the insulating film 63, and a protective layer 10 is formed on the magnetic film 4 by means of spattering or the like.

In the above-mentioned case, a method of manufacturing a thin film magnetic head used for in-plane recording and reproducing has been explained. However, the same processes can be applied to a case for manufacturing a thin film magnetic head for vertical recording and reproducing.

In the above-mentioned thin film magnetic head of this kind, an important problem is to reduce an electric resistance in the conductive coil 5, which is required by a magnetic disk drive. In order to reduce the electric resistance of the conductive coil 5, it is necessary to increase the width or the height of the film 5. However, it is difficult to increase the width of the conductive coil 5 because a high density of wiring be maintained as possible. On the other hand, when the height of the conductive coil 5 is to be increased to thereby increase the cross-sectional area of the film 5, it is also necessary to increase the height $h_1$ of the photoresist film 11 in FIG. 8. However, the width $W_3$ of the bottom surface of the photoresist film 11 is at most about 2 $\mu m$ because of the necessity of maintaining a high density of wiring as possible, and the height $h_1$ of the photoresist film 11 which has the width $W_3$ of the bottom surface is at most about 3 μm even though a material having excellent perpendicularity is used for the photoresist film 11. Accordingly, it is necessary that the conductive film 5B is $\Delta h_{12}$ lower than the height $h_1$ in considering of an error because the total height $h_2$ of the undercoat conductive film 5A and the conductive film 5B is higher than the height $h_1$ of the photoresist film 11. When the height $h_2$ exceeds the height $h_1$, there causes a short circuit between adjacent conductive films 5A, 5A. Accordingly, the height $h_2$ should be at most about 2.5 μm at present. Therefore, an attempt to increase the height $h_2$ to thereby increase the cross-sectional surface area of the conductive coil 5 reaches limit.

SUMMARY OF THE INVENTION

It is an object of the present invention to provides a thin film magnetic head which increases the cross-sectional surface area of a conductive coil and reduces an electric resistance without causing a danger of a short circuit and of reducing the density of wiring.

The foregoing and other objects of the present invention have been attained by providing a thin film magnetic head which comprises a substrate, and magnetic films and a conductive coil which are formed on the substrate to constitute a thin film magnetic circuit, wherein the conductive coil has a shape in cross section so that its upper part has a curved convex surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7a through 7g are diagrams for illustrating steps of manufacturing a conventional thin film magnetic head; and FIG. 8 is a diagram showing a step of manufacturing the thin film magnetic head.

DETAILED DESCRIPTION OF THE PREFERRED EMBODIMENTS

Figure 1:
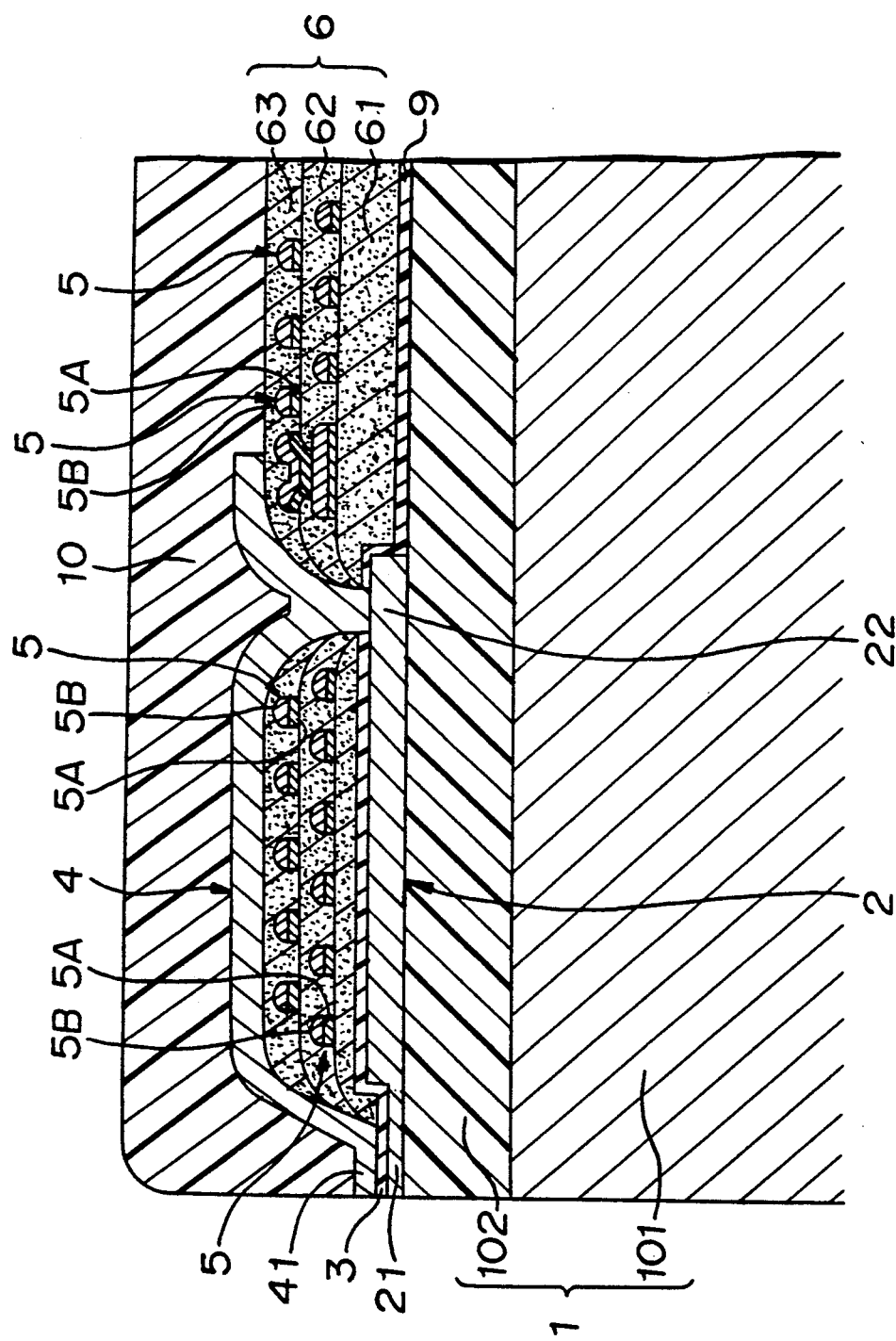
FIG. 1 is a cross-sectional view partly broken of an important portion of an embodiment of the thin film magnetic head according to the present invention.
Figure 2:
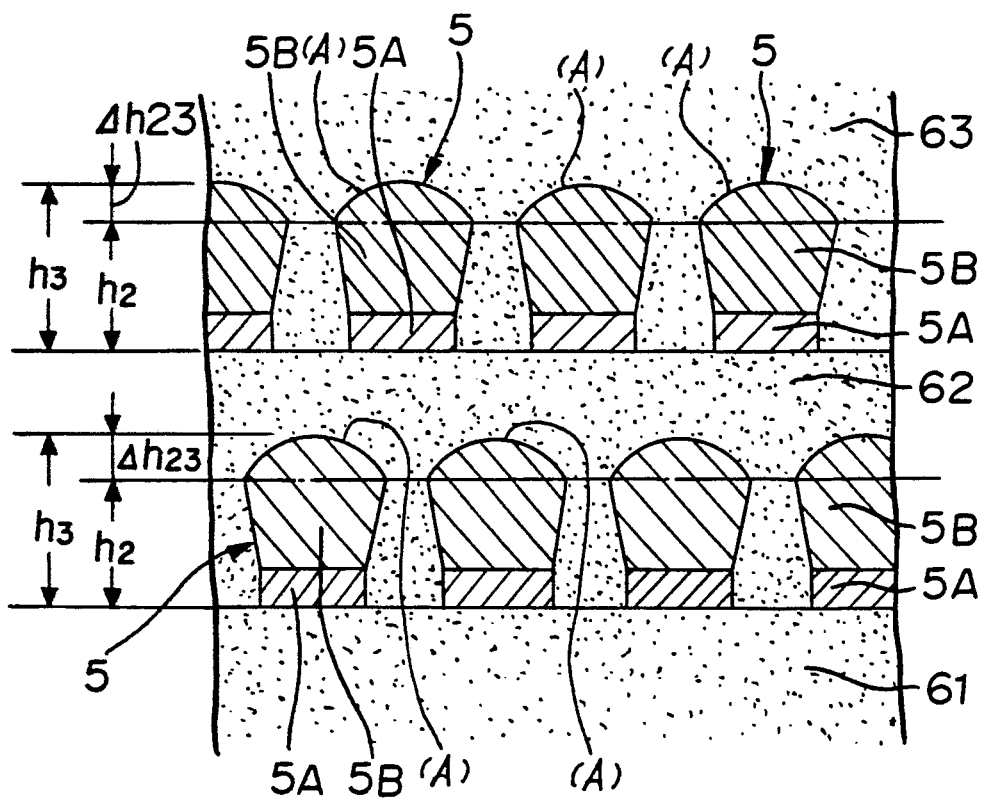
FIG. 2 is an enlarged cross-sectional view showing the conductive coil portion.

Referring to the drawings wherein the same reference numerals designate the same or corresponding parts, FIG. 1 is a cross-sectional view of an important portion of an embodiment of the thin film magnetic head according to the present invention and FIG. 2 is an enlarged cross-sectional view showing a conductive coil portion.

A conductive coil 5 has a shape in cross-section wherein the upper part is constituted by a curved convex surface (A). The curved convex surface (A) is a curved part formed by a quadratic curve such as a part of circle, a parabola line, an ellipse or the like.

As shown in FIG. 2, the height $h_3$ of the conductive coil 5 having a curved convex surface (A) is $\Delta h_{23}$ higher than the height $h_2$ of the conventional conductive coil 5 wherein the upper surface is flat. Accordingly, the cross-sectional area of the conductive coil 5 formed in accordance with the present invention can be increased in correspondence to $\Delta h_{23}$ to thereby reduce the electric resistance.

Figure 3:
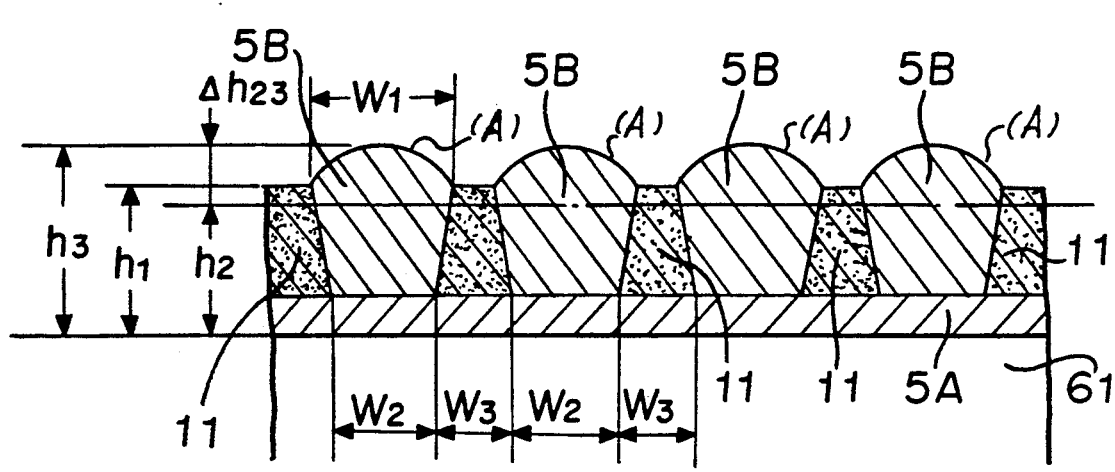
FIG. 3 is a cross-sectional view showing a process of forming the conductive coil.

FIG. 3 is a diagram showing a step of forming a conductive film by plating (which corresponds to FIG. 7f). In this case, there is no danger of a short circuit between adjacent conductive films 5B, 5B even when the conductive films 5B are formed by Cu plating so that the height of each of the conductive films 5B is higher than the height $h_2$ of the resist films 11 by $\Delta h_{23}$. Accordingly, it is possible to increase the cross-sectional surface area of the conductive coil 5 to thereby reduce the electric resistance. The formation of the conductive films 5B by plating so that the upper part has a curved convex surface (A) can be realized by, for instance, suitably selecting a bath for plating.

Figure 4:
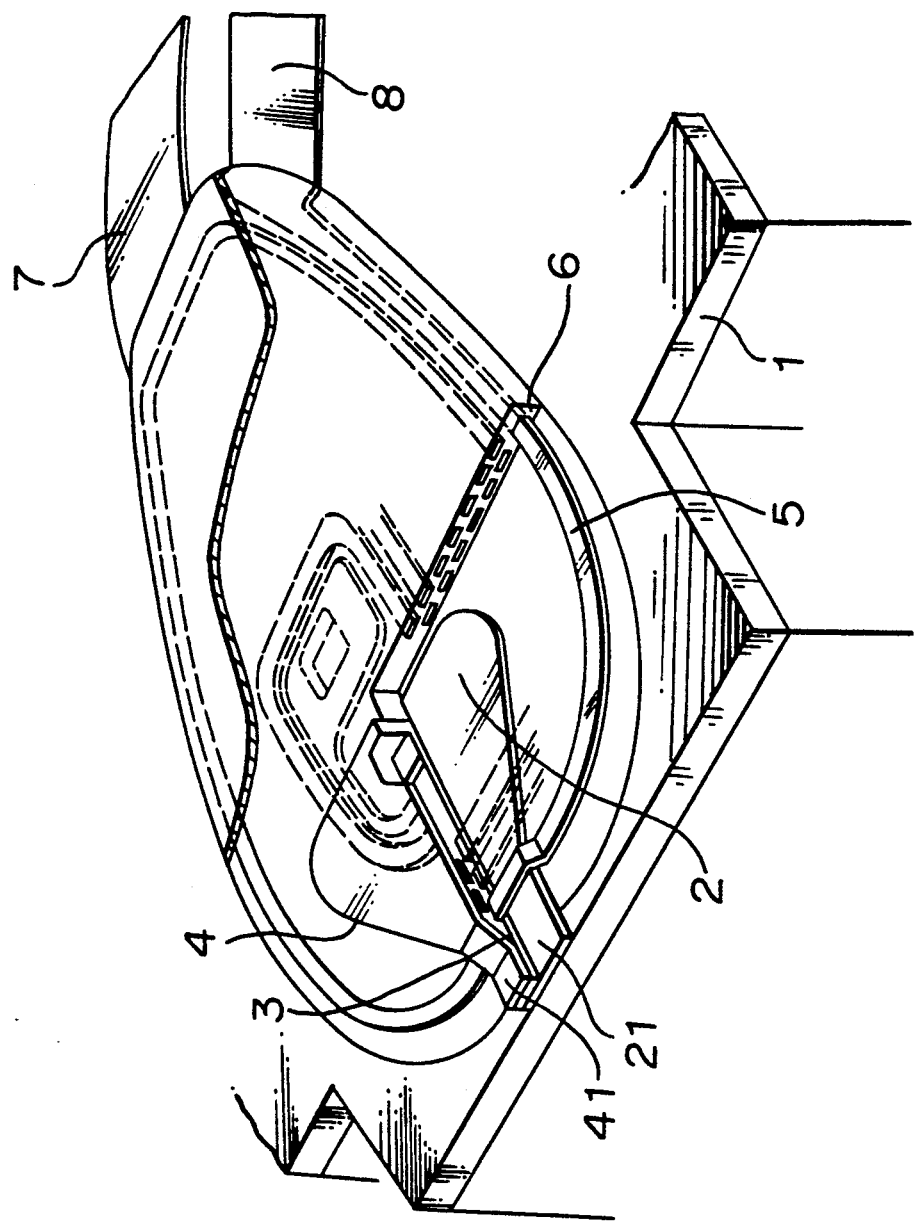
FIG. 4 is a perspective view of an important portion of a thin film magnetic head.
Figure 5:
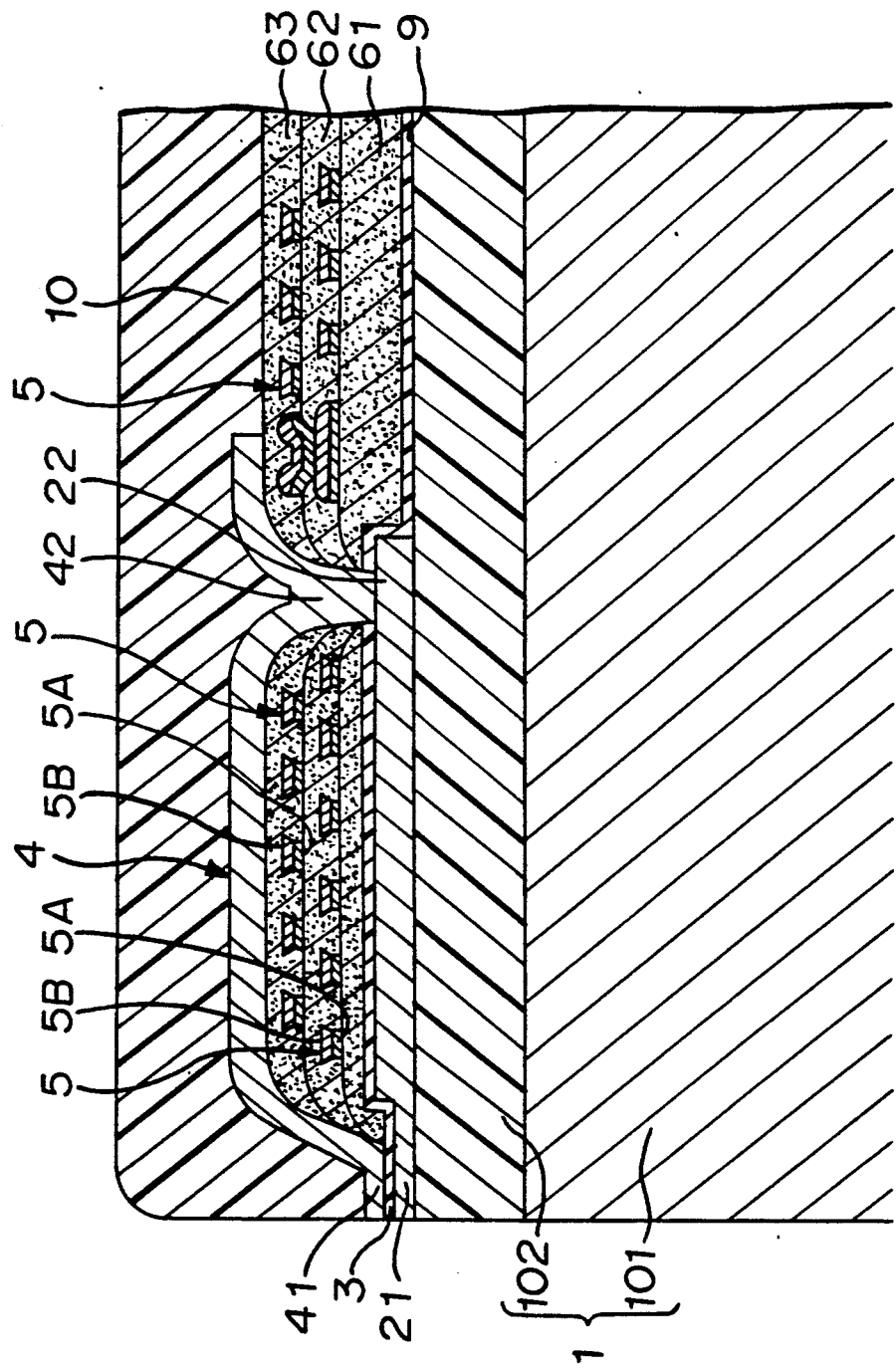
FIG. 5 is a cross-sectional view of an important portion of a thin film magnetic head.
Figure 6:
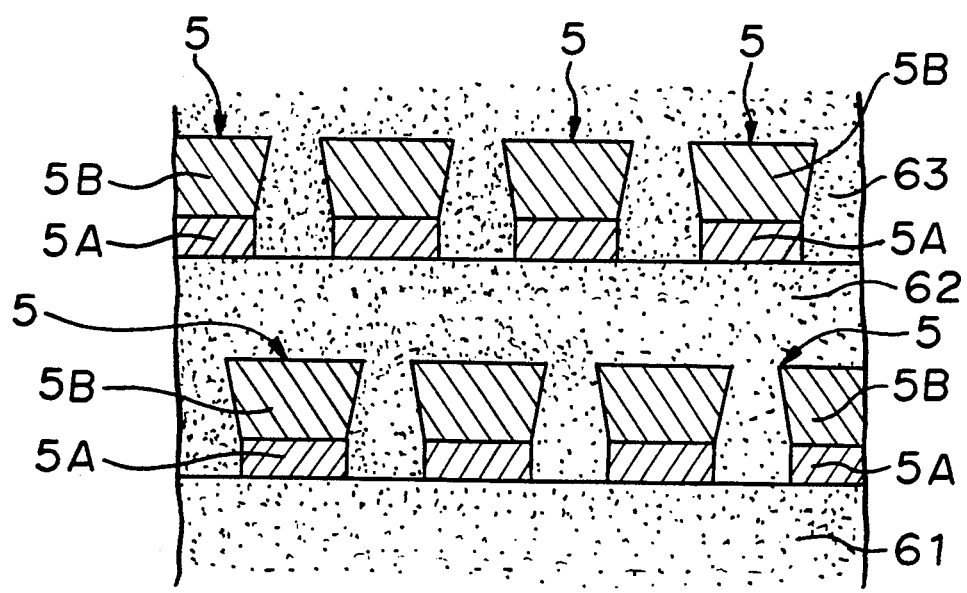
FIG. 6 is an enlarged cross-sectional view which shows the conductive coil portion of a conventional thin film magnetic head.

As shown in FIGS. 1, 4 and 5, there are formed upper and lower conductive coils in two stage wherein the position of the upper conductive coil is deflected from that of the lower conductive coil in the transverse direction.

Thus, in accordance with the thin film magnetic head of the present invention wherein a conductive coil has a shape in cross section wherein the upper part has a curved convex surface, the cross-sectional surface area of the conductive coil can be increased and the electric resistance can be reduced without inviting a short circuit and the reduction of the density of wiring.

Obviously, numerous modifications and variations of the present invention are possible in light of the above teachings. It is therefore to be understood that within the scope of the appended claims, the invention may be practiced otherwise than as specifically described herein.

What is claimed is:

1. A thin film magnetic head, comprising:
    a substrate having a flat horizontal surface;
    an insulating film provided on said surface;
    a first conductive coil embedded in said insulating film and a second conductive coil embedded in said insulating film above said first conductive coil, each coil including a plurality of windings, the windings of each coil being uniformly spaced apart and the windings of said second conductive coil being offset in the horizontal direction from the windings of said first conductive coil, each said winding having in cross-section a first part and a second part, said first part being generally trapezoidal in shape, said first part being defined in a photolithographic method, said second part being mounted on said first part and coextensive therewith, said second part having a curved convex upper surface formed by plating, said second part of said first coil being spaced from said first part of said second coil and insulated therefrom by said insulating film; and
    magnetic films, said coils and said films constituting a thin film magnetic circuit.

* * * * *